United States Patent [19]

Saiia et al.

[11] Patent Number: 5,016,969
[45] Date of Patent: May 21, 1991

[54] MECHANISM FOR NESTING AN OPTICAL FIBER IN AN OPTICAL COUPLER AND PROVIDING POSITIVE STOP OPENING AND CLOSING POSITIONS FOR THE COUPLER

[75] Inventors: Louis S. Saiia, San Jose; Whitfield G. Halstead, San Mateo, both of Calif.

[73] Assignee: Raynet Corporation, Menlo Park, Calif.

[21] Appl. No.: 399,684

[22] Filed: Aug. 28, 1989

[51] Int. Cl.⁵ .......................... G02B 6/36; G02B 7/26
[52] U.S. Cl. ................................................ 350/96.20
[58] Field of Search ............... 350/96.20, 96.21, 96.22, 350/96.15

[56] References Cited

U.S. PATENT DOCUMENTS 4,889,403 12/1989 Zucker et al. ................... 350/96.15

Primary Examiner—William L. Sikes
Assistant Examiner—Robert E. Wise
Attorney, Agent, or Firm—Dennis E. Kovach

[57] ABSTRACT

An optical coupler for coupling light between an optical fiber core and an electrooptic transducer includes a pin and channel arrangement associated with a mechanism for opening and closing the coupler. At one position the pin engages an end of the channel whereat the coupler is open and safe insertion or removal of the fiber from the coupler is possible. At a second position, the pin engages another end of the channel and an optical fiber previously inserted into the coupler when in its open position is securely locked in the optical coupler.

12 Claims, 4 Drawing Sheets

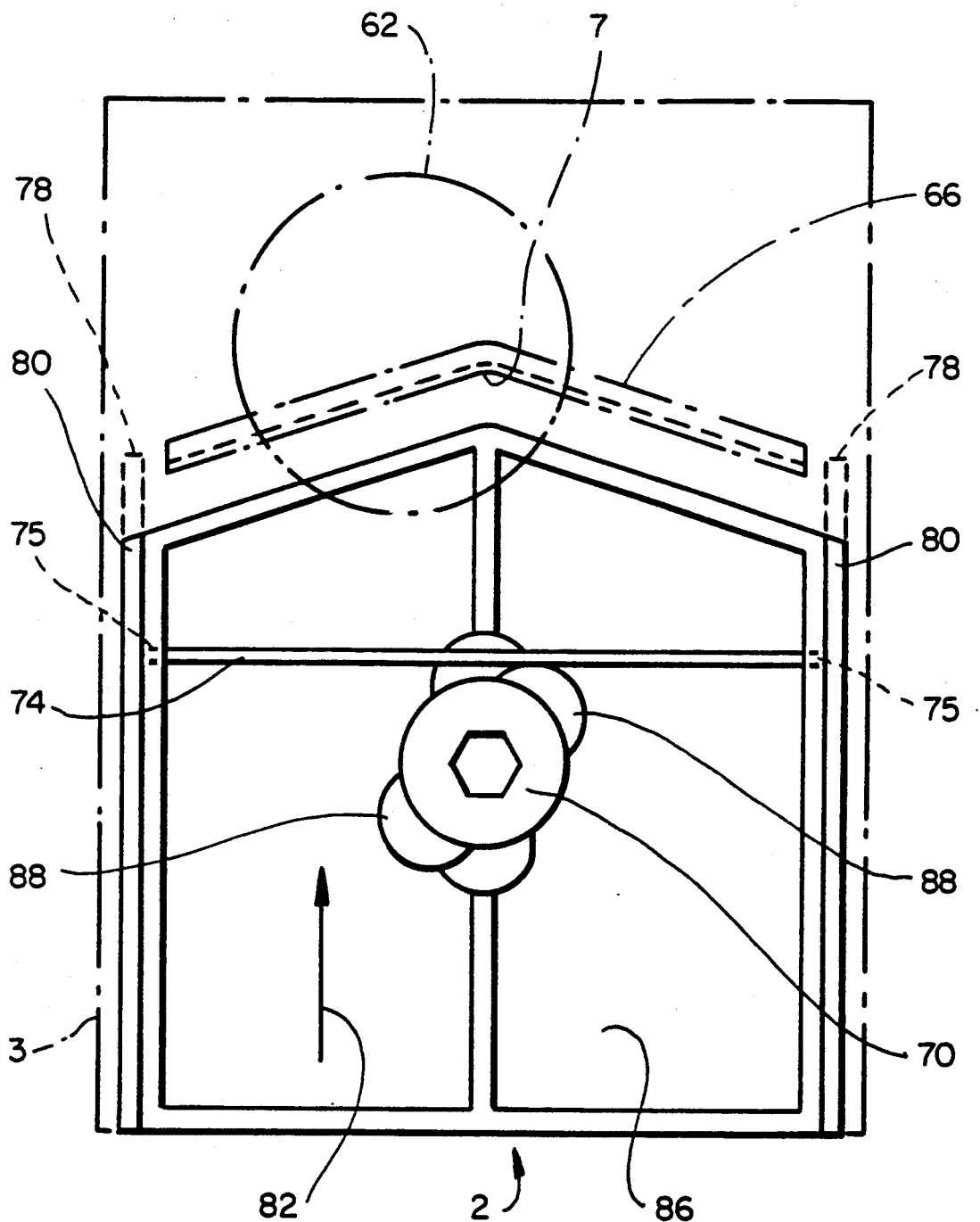
FIG_1
*(PRIOR ART)*

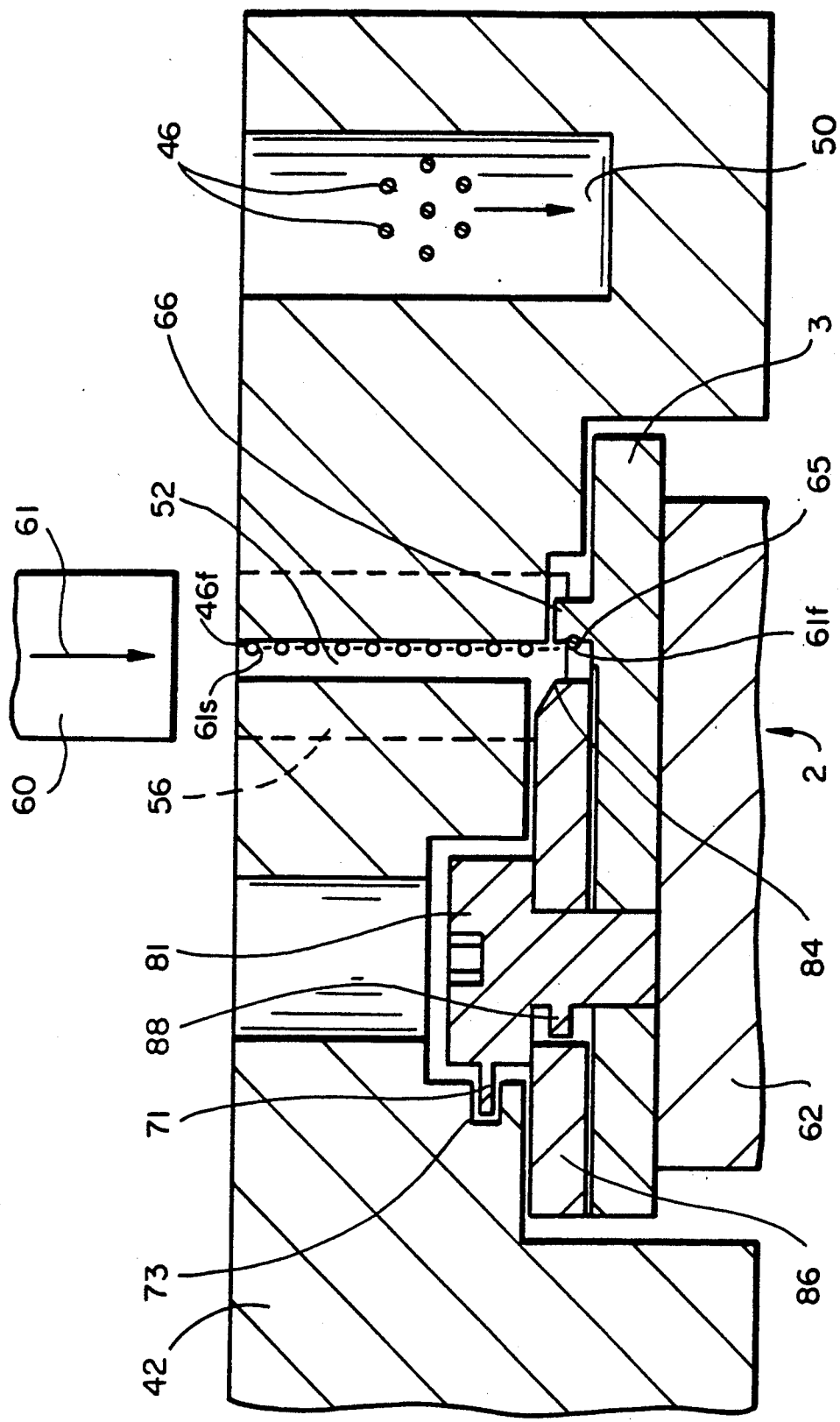
FIG_2

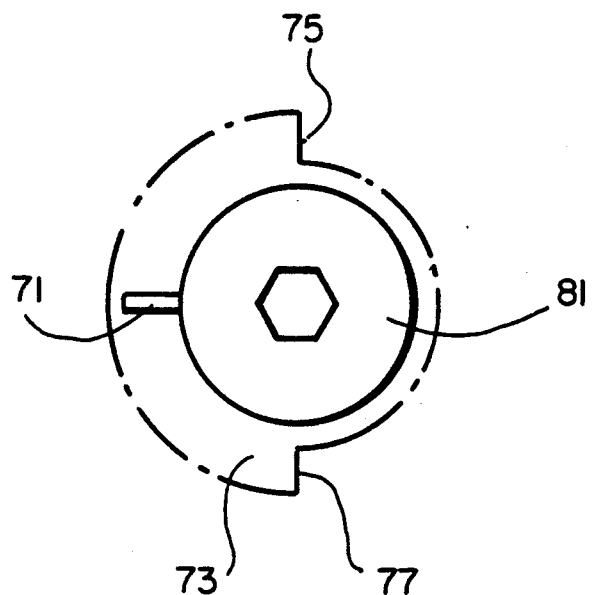
FIG_3
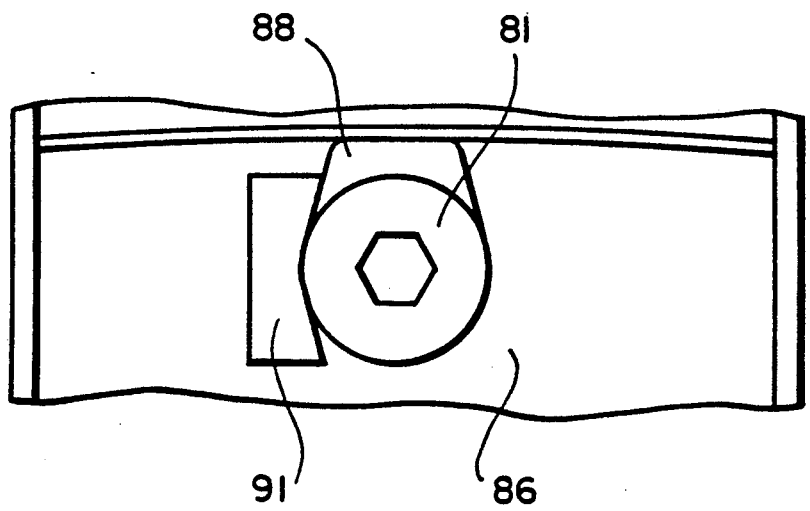
FIG_4

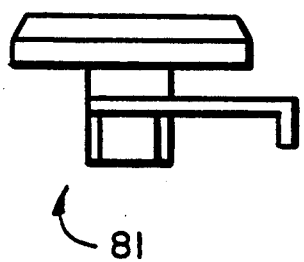
*FIG_5a*
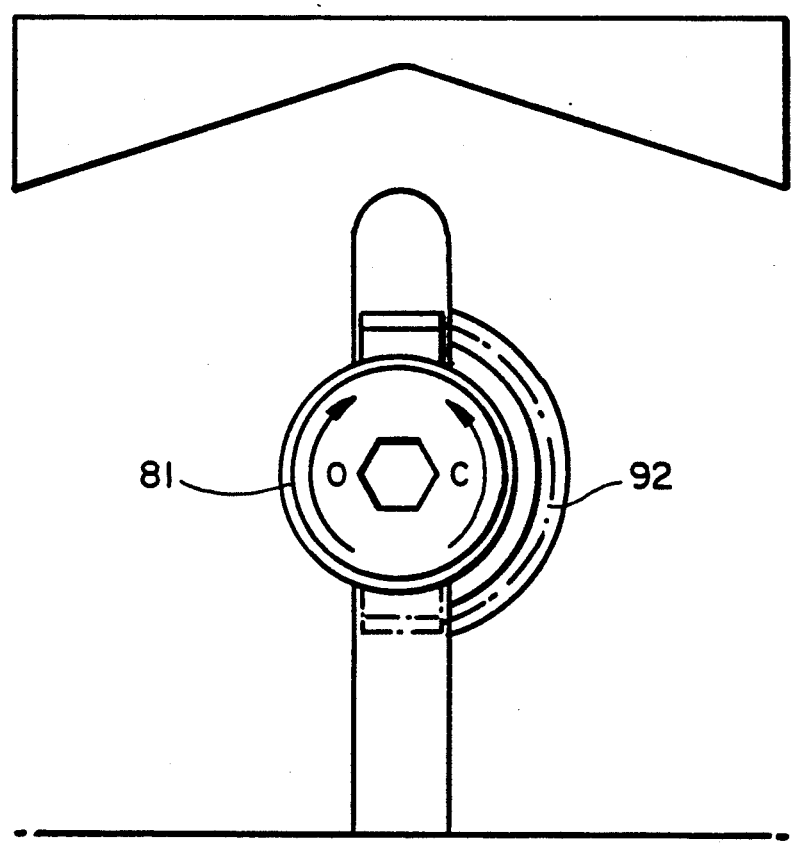
*FIG_5b*

MECHANISM FOR NESTING AN OPTICAL FIBER IN AN OPTICAL COUPLER AND PROVIDING POSITIVE STOP OPENING AND CLOSING POSITIONS FOR THE COUPLER

BACKGROUND OF THE INVENTION

The present invention relates to a mechanism for nesting an optical fiber in an optical coupler and providing positive stop opening and closing positions for the coupler, the mechanism functioning to provide a first positive stop position whereat a loading mechanism of the optical coupler is positioned so that easy fiber insertion into and out of the optical coupler is possible, the mechanism having another positive stop position whereat an optical fiber is disposed within a carefully oriented and predetermined nest path within a bent groove and urged therein by a resilient force so as to result in predictable and consistent coupling efficiencies between an electrooptic transducer and a core of the fiber.

Optical fiber transmission systems are widely preferred over metallic transmission systems due to the enhanced bandwidth capability of optical fiber and its immunity to EMI and RMI interference. A continuing problem with optical fiber systems is the provision of optimum craft friendly couplers for coupling light between an electrooptic transducer and an optical fiber core.

Campbell et al., U.S. Pat. No. 4,728,169 describes a user friendly optical fiber coupler whereby light is coupled between a fiber core and the transducer by passing the light through a buffer of the optical fiber, and further preferred embodiments thereof are described by Uken in U.S. Pat. No. 4,741,584; Koht et al. in U.S. Pat. application Ser. No. 252,915 filed Sept. 30, 1988, now abandoned; Uken et al. in U.S. Pat. No. 4,889,403; Campbell et al. in U.S. patent application Ser. No. 137,317 filed Dec. 13, 1987; and Uken in U.S. patent application Ser. No. 213,642 filed June 30, 1988; the disclosures of which are all incorporated herein by reference. Though these coupler structures yield a user friendly means of coupling optical signals onto and off of optical fibers, a continuing need exists to render assembly and disassembly of such couplers yet even further user friendly.

SUMMARY OF THE INVENTION

It is an object of the invention to provide yet a further user friendly optical coupler which is very easily assembled and disassembled from an optical fiber.

These and other objects of the invention are achieved by the provision of an optical coupler which includes a mechanism for accurately and consistently nesting an optical fiber in an optical coupler so as to provide a predictable and consistently repeatable specified bend radius over a specified sector angle for the optical fiber so that predictable optical coupling between an electrooptic transducer and an optical fiber core is possible at the fiber bend, the mechanism further including positive stop opening and closing positions so that the coupler can be opened very easily so as to allow safe fiber insertion or safe fiber removal from the coupler as well as a positive stop closing position whereat the fiber is securely nested within its predetermined bend orientation with a resilient force.

These and other objects of the invention are specifically achieved by an optical fiber coupler mechanism, comprising:
 a coupler body;
 a slideable member engageable and disengageable with the coupler body, the slideable member and coupler body forming an optical fiber coupling region therebetween for an optical fiber when engaged;
 rotating means for sliding the slideable member towards and away from the optical fiber coupling region;
 means for limiting movement of the rotating means at a first movement limiting position such that at the first movement limiting position the slideable member is either in its disengaged position whereat the optical fiber is optically disengaged from the coupling region or the slideable member is in its engaged position whereat an optical fiber is optically engaged with the coupling region.

Other preferred features of the invention are further described by reference to the following drawings and detailed description.

BRIEF DESCRIPTION OF THE DRAWINGS

FIG. 1 illustrates a prior art coupler which includes means for engaging and disengaging an optical fiber;

FIG. 2 illustrates a first preferred embodiment of the invention whereby a degree of rotation of a rotational member for closing and opening the coupler is illustrated;

FIG. 3 illustrates a detailed view of the rotational limiting means illustrated in FIG. 2; and FIG. 4 illustrates a second preferred embodiment of the invention.

FIGS. 5a and 5b illustrate a further preferred embodiment of the invention.

DESCRIPTION OF THE PREFERRED EMBODIMENTS

FIG. 1 illustrates an optical coupler 2 which couples light between an electrooptic transducer 62, e.g. a light emitter, light detector, or a waveguide connected to such an emitter or detector, the coupler including a slideable member 86 which is connected to a resilient spring 74 at opposite ends 75 thereof, the member 86 sliding relative to a coupler body 3 along a direction of arrows 82.

The slideable member has an end surface 84 having a shape complementary to that of a fiber bending surface 66 on the coupler body 3. The surface has a fiber positioning groove 65 therein. Specifically, the fiber bending surface 66 and fiber positioning groove 65 are precisely and carefully formed so as to impose upon an optical fiber nested therein when urged therein by the end surface 84 a carefully configured and predictable bend radius across a predetermined sector angle of the fiber which achieves a predetermined amount or efficiency of optical coupling between an electrooptic transducer and an optical fiber. Preferred bend radii range between 1.5 and 15 mm depending upon the type of fiber used and its waveguiding characteristics and also by an amount of optical coupling desired based upon network system parameters. A particular preferred embodiment is to use a bend radius which is approximately 3.86 mm over a sector angle of approximately 30° which is preferred for use for optical couplers disposed in series arranged in a bus architecture having approximately 24 couplers linearly disposed on each a read bus and write bus utilizing silica fiber having both a glass core and a glass cladding, either multimode or single mode.

Preferably a depth of the groove 65 is only slightly larger than an outside diameter of a buffer of the fiber so that the fiber is accurately positioned in a non-moveable manner when the coupler is closed on the fiber. Accordingly, optimum designs utilize a groove depth which is between 0 and 10% greater than a diameter of the fiber buffer. Preferably, the slideable member 86 slides relative to the coupler body 3 via engaging rails and channels 78, 80 respectively. When the slideable member 86 is slid towards the coupler body groove 65, an optical fiber (not shown) is positioned between and held by the surface 84 and the groove 65 such that light coupling at a bend is possible with a core of the fiber. Light coupled either from the fiber core towards the transducer 62 or vice versa is deflected 90° out of a plane of the surface of FIG. 1 by a focusing deflection surface 7 which has an approximate orientation of 45° relative to the plane of FIG. 1 so that light is deflected in a direction normal to that of the plane.

To position and hold a fiber in the coupler, a rotational member 70 having a cam 88 thereon is rotated which allows the cam 88 to engage the spring 74 and consequently resiliently urge the slideable member 86 in a desired coupler closing position whereat the spring is positively deflected so as to resiliently maintain a compressive force on the fiber. To open the coupler, the rotational member 70 is rotated so that the cam 88 disengages from the spring 74 and consequently releases the resilient compressive force on the fiber with the cam further engaging a back surface of the slideable member 86 so as to urge it in a direction downward in the drawing of FIG. 1 so as to create a positive separation between the groove 65 and the end of surface 84. In this orientation of the coupler, an optical fiber previously held in the optical coupler is quite easily removeable from the optical coupler with little to now danger of fiber breakage, and alternatively if an optical fiber is to be installed in the optical coupler while it is in this attitude, sufficient room and clearance between the groove 65 and surface 84 exists so that the fiber can easily be nested therebetween so that upon further rotation of the rotational member 70 the fiber will be accurately nested within the groove 65 upon closing the coupler.

FIG. 2 illustrates a cross-sectional view of a preferred embodiment of the invention whereby a rotational member 81 further includes a protruding pin 71 which is slideable within a groove 73 formed in a holder or tray 42 which holds the coupler at a predetermined position, optimally relative to a substrate board, e.g. printed circuit board, (not shown). Reference numeral 61s refers to an entrance position of a fiber within the holder 42, whereupon a fiber loading element 60 urges the fiber 46f downwards along a direction of arrow 61 so as to move the fiber towards its loading position 61f so as to be positioned within the groove 65 of the coupler body 60 when the slideable member 86 is in its open position. Reference numeral 56 illustrates a channel for the element 60; 52 a slit for accommodating a longitudinal length of the fiber; and 46 unused fibers stored in area 50.

FIG. 3 illustrates a cutaway view of a construction of the pin groove 73 and the pin 71 of the rotational member 81, the groove 73 having first and second pin movement limiting positions 75, 77, respectively. As this figure illustrates, the rotational member 81 is only allowed to rotate through an arc of approximately 180° due to interengagement between the pin 71 and the groove positions 75, 77.

According to the invention, the positions 75, 77 are so arranged such that subsequent to loading the fiber in the groove 65 with the coupler open, the rotational member 81 is turned until the pin 71 engages the position 75. Doing so causes the slideable member 86 to be urged in its closed position by the cam 88 being fully engaged against the spring 74 so as to deflect the spring and resiliently urge the slideable member closed such that the optical fiber is securely held within the groove 65 and accurately positioned such that optimum light coupling between the transducer 62 and a core of the optical fiber results. Furthermore, when the rotational member is rotated 180° from the first position 75, the cam disengages the spring and also urges the slideable member away from the groove 65. When the pin 71 engages the second position 77, the cam 88 is completely disengaged from the spring 74 and the slideable member 86 is in its open position relative to the coupler body 3 so that the fiber can safely be removed from the coupler and holder.

According to this construction, a craftsman need not have any "feel" or skill in determining at which point the rotational member 81 must be positioned so that the optical fiber is securely located in a fully closed coupler position, or alternatively when the coupler is completely open such that safe removal or insertion of an optical fiber is possible. Accordingly, installation of an optical fiber within the coupler is facilitated as is the operation of removing an optical fiber from the coupler.

FIG. 4 illustrates an alternative embodiment where a surface 91 can be formed on the slideable member 86 so as to directly engage the cam 88 so as to produce first and second stop positions as desired. This embodiment has a potential possible disadvantage of producing unnecessary rotational forces on the slideable member 86. According to yet a further embodiment, the stopping mechanism could be designed into the coupler body, e.g. provide a channel therein. Furthermore, the pin need not be straight as illustrated in FIG. 3, but could be hooked as shown in FIG. 5a thus creating further freedom of choice as to whether to use a positive stop ridge or channel, as desired, FIG. 5b showing a channel 92 for the hook in the coupler body.

It will be appreciated by those skilled in the art that other engaging and disengaging surfaces could be designed so as to achieve the required resultant stopping function as previously described. In particular, though embodiments have been described whereby the rotational member slides through an arc of approximately 180°, it will be appreciated by those skilled in the art that different rotational angles are possible to yet achieve the same result, specifically a 45° or 60° rotational angle could work so long as such an angle allowed the cam or other spring sliding activating member 86 to be sufficiently urged against the spring in the coupler closed position and be completely open therefrom in its disengaged position. Likewise, a 270° rotational angle would also be easily designable. Accordingly, the invention is not to be limited by the specific preferred embodiments described herein, but only by the appended claims.

We claim:

1. An optical fiber coupler mechanism, comprising:

a coupler body;

a slideable member engageable and disengageable with the coupler body, the slideable member and coupler body forming an optical fiber coupling region therebetween for an optical fiber when engaged;

rotating means for sliding the slideable member towards and away from the optical fiber coupling region;

means for limiting movement of the rotating means at a first movement limiting position such that at the first movement limiting position the slideable member is either in its disengaged position whereat the optical fiber is optically disengaged from the coupling region or the slideable member is in its engaged position whereat an optical fiber is optically engaged with the coupling region.

2. The mechanism of claim 1, the movement limiting means including a second movement limiting position whereat the slideable member is in its engaged position with the coupler body such that an optical fiber is optically engaged with the coupling region, the slideable member being in its disengaged position relative to the coupling region when the movement limiting means is in its first position.

3. The mechanism of claim 2, the first and second movement limiting positions being offset by approximately 180°.

4. The mechanism of claim 2, the movement limiting means comprising a pin disposed in a channel having first and second ends defining the first and second positions.

5. The mechanism of claim 4, the pin being disposed on a rod having means for engaging a tool on its upper surface for inducing rotation to the rod.

6. The mechanism of claim 4, further comprising a coupler tray, the channel being disposed in the coupler tray.

7. The mechanism of claim 4, the channel being disposed within the slideable member.

8. The mechanism of claim 4, the channel being disposed in the coupler body, the pin having a substantially 90° hook thereon for engaging the channel from a location above the coupler body.

9. The mechanism of claim 2, the movement limiting means comprising a ridge extending upward from the slideable member, the ridge being engageable with the cam.

10. The mechanism of claim 2, further comprising a resilient spring attached to the slideable member, the rotating means including a cam for engaging the resilient spring, the cam constantly resiliently urging the slideable member against the optical fiber coupling region when the movement limiting means is at its second movement limiting position.

11. The mechanism of claim 10, the cam urging the slideable member away from the coupling region so as to create a predetermined separation therebetween when the movement limiting means is at its first movement limiting position.

12. The mechanism of claim 1, the coupling region having a shape so as to impose a specified and predetermined bend radius and sector angle for an optical fiber when the movement limiting means is in its first movement limiting position.

* * * * *